Jan. 6, 1970    H. G. ANDERSON    3,488,176
STEM MAKING MACHINE FOR ELECTRIC LAMPS AND SIMILAR DEVICES
Filed May 23, 1966    3 Sheets-Sheet 1
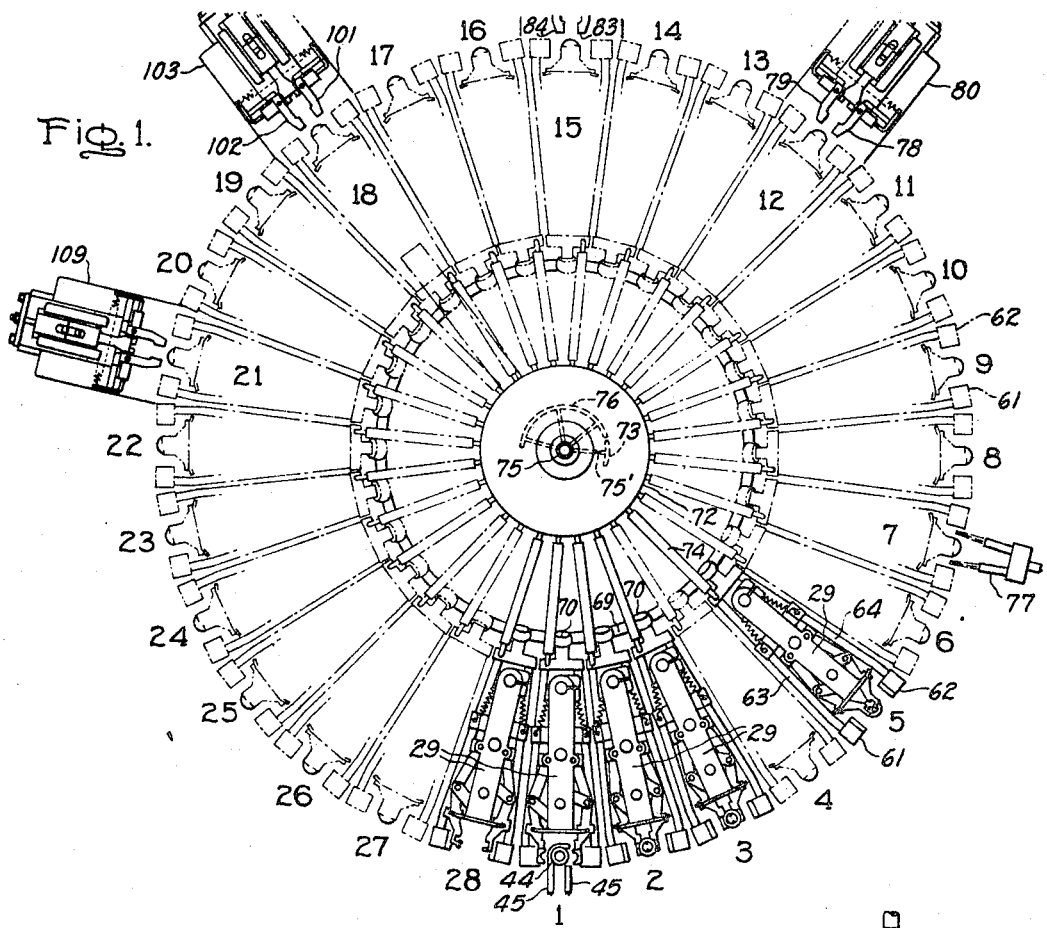
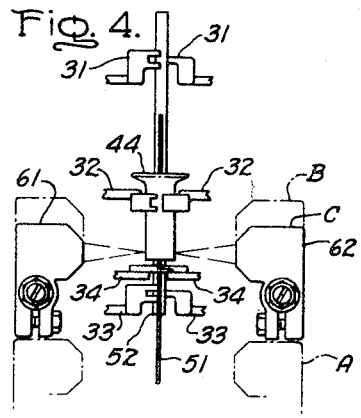
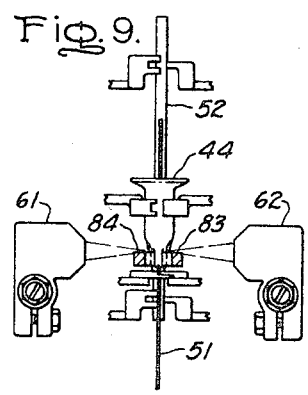
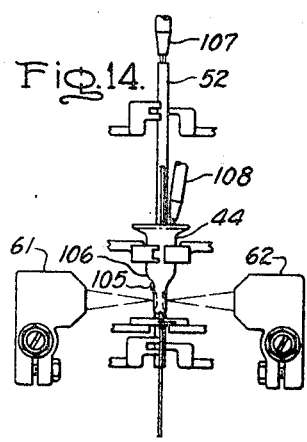
Inventor:
Harold G. Anderson
by Otto Tichy
His Attorney

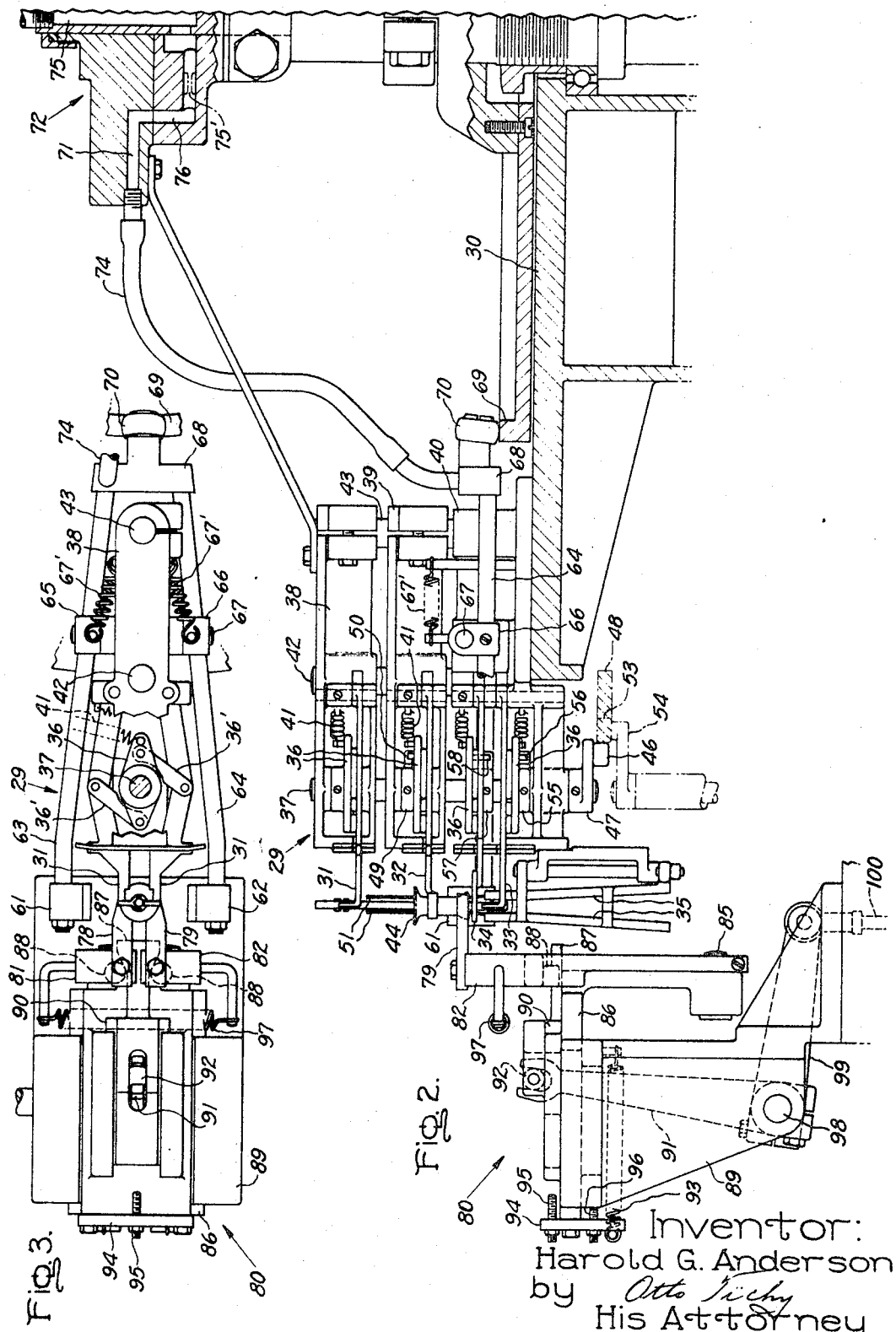

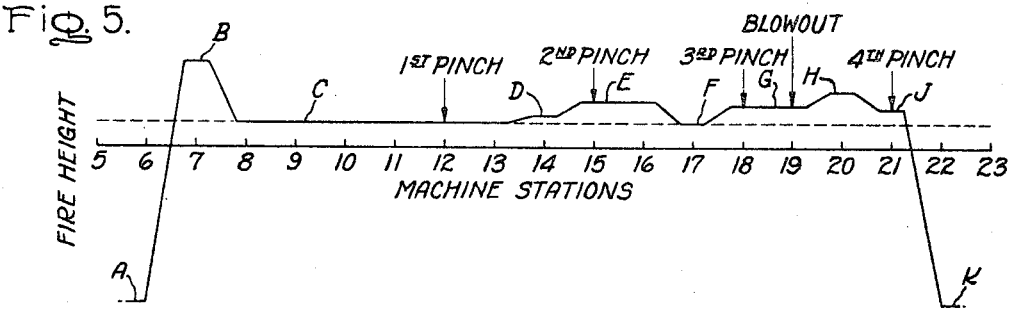
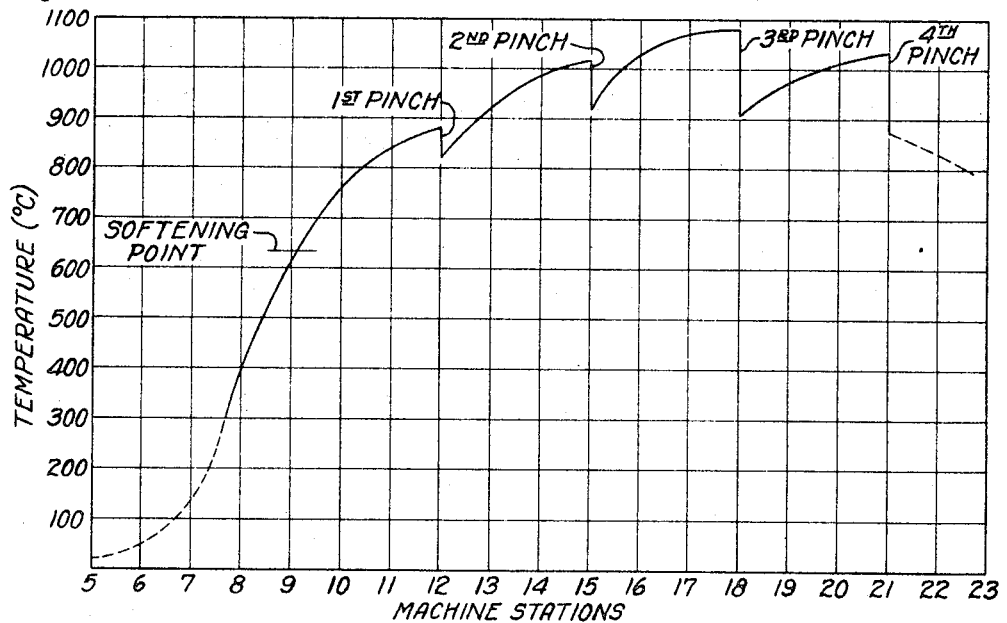
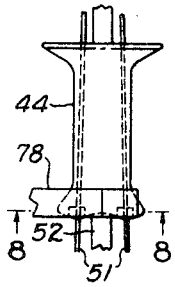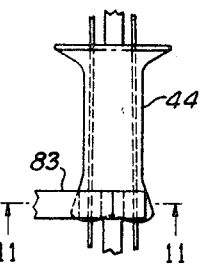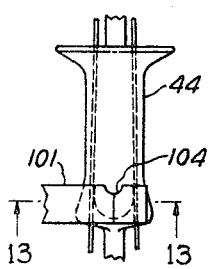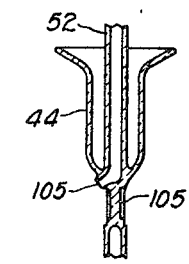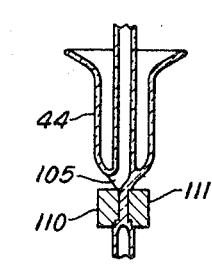
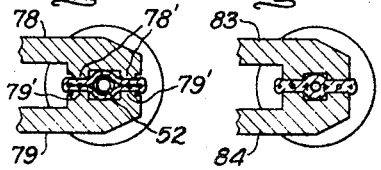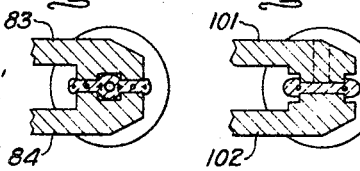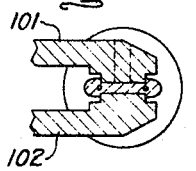

United States Patent Office 3,488,176
Patented Jan. 6, 1970

3,488,176
STEM MAKING MACHINE FOR ELECTRIC LAMPS
AND SIMILAR DEVICES
Harold G. Anderson, Kirtland, Ohio, assignor to General
Electric Company, a corporation of New York
Filed May 23, 1966, Ser. No. 552,155
Int. Cl. C03b 23/14
U.S. Cl. 65—138    3 Claims

ABSTRACT OF THE DISCLOSURE

In a rotary turret indexing lamp stem-making machine, the standard heating burners mounted adjacent the turret and swung into operative positions adjacent the heads during the dwell periods of the turret, are replaced by pairs of burners mounted on the turret adjacent each head, each supplied with gas in equal predetermined amount and composition and arranged to be moved vertically up and down to predetermined elevations to properly heat the stem tube throughout the dwell and indexing periods of the turret preparatory to the operations of pinching, blowout of the exhaust aperture and reworking of the seal. The means mounting the burners for vertical movement include burner support members which are mounted for pivotal movement about a horizontal axis intermediate their ends.

---

This invention relates to apparatus for making stems of the well known tipless type for electric lamps and similar devices. Such stems comprises a glass stem tube having a glass exhaust tube arranged concentrically therein with a plurality of lead wires extending through the annular space between said stem and exhaust tubes. An end of the stem tube, and the enclosed portion of the exhaust tube, are fused and pinched together to form a pinch or press portion which hermetically closes the stem and exhaust tubes and embeds portions of the lead wires therein, and an exhaust aperture is blown through the side wall of the stem tube immediately adjacent the said press portion and in communication with the exhaust tube.

Such stems have, since their inception well over forty years ago, been made on stem making machines essentially like that shown in Patent 1,655,141 to J. T. Fagan et al. Such a machine comprises a rotatable indexing turret having at its periphery, a plurality of heads arranged to support the stem parts in vertical position. The glass parts are heated by burner units which are mounted at a series of stations around the turret and each of which includes a pair of burners arranged to be swung toward the turret in operative relation to the heads during the dwell periods of the turret. The burners are swung back out of the way of the heads during indexing of the turret. There are also mounted at certain stations about the turret, pinch or press units which move into operative relation to a head located at a pinch station and which pinch the heated glass parts to form the stem press during the dwell period of the turret. At other stations there are provided means for blowing air into the annular space between the stem and exhaust tubes to rework and round out the sealed juncture of those tubes.

Such machines possess certain disadvantages respecting the arrangement and operation of the burners, which are further aggravated due to the ever increasing speeds with which such machines are operated. For example, with machine speeds such as 3000 indexes per hour, severe strains have been imposed on the mechanical movements required to swing the burners into and out of their heating positions. Extensive damage and inoperative periods of the machine are incurred when units fail in this operation. Furthermore, since the burners must be moved in and out of position to index the machines, approximately 25% of the fire or heating time is lost. Each time the fires are swung into position they must make up heat which is lost while the stems are being indexed. Under the circumstances, the burners on such machines are now being operated at peak capacity. In order to overcome this 25% lost heating time, especially on the higher speed machines, it has been necessary to add oxygen to the gas mixture at certain positions. In some cases, dupplicate burner assemblies are being used to secure additional heat.

Moreover, in the prior art construction, the operators are required to adjust the fires at each burner unit and alter the flow of gas, air and oxygen by needle valves. Thus, each machine will have different heats, with various results from each piece of equipment. Heat uniformity is impossible to achieve. Setting these fires into the proper position is the responsibility of the individual operator or machine mechanic. Furthermore, the area around the heating stations is quite confined with various valves and a mixer for each set of fires. Air and gas manifolds also hinder the adjustment and maintenance of stem heads, fire settings, etc. It is difficult to keep the machines free of broken glass, lead wires, etc. Fires are difficult to balance, especially at high speed, because of the swinging movement of the burner yoke for turret index. Moreover, special wiring, regulators, mixers, etc., add considerably to the cost of the machines and to the stem manufacturing process.

Accordingly, it is the principal object of this invention to provide a new organization of elements which will obviate the above-stated disadvantages in stem making machines which require the hermetic sealing of glass-to-glass and metal-to-glass parts.

In accordance with the invention, there is provided for the first time in a stem making machine, a novel arrangement wherein a pair of burners is mounted on the turret itself adjacent each head to be at opposite sides of the stem parts supported by the head along with means to supply a flow of combustible heating gas mixture in equal predetermined amounts and composition to all burners continuously over a period during which indexing of the turret carries the heads to a series of working stations around the turret. There are also provided means for effecting movement of the burners vertically to be at predetermined different levels at predetermined ones of said stations for optimum heating of selected predetermined portions of the glass stem and exhaust tubes preparatory to the operations of pinching, blow-out and reworking.

The burners are thereby attached to each stem head and rotate with the turret during the entire index time. Premixed air and gas is brought to each set of burners preferably through a rotary valve located on the axis of the turret, and the same ratio of gas and air is used for all burners. The need for varying the gas composition is dispensed with, as is the setting of the burners into various different positions at the various work stations. The burners are merely raised and lowered a slight amount for various heat positions on the steam, and they are preferably also arranged to be lowered below the transfer station and the loading stations for the various stem parts, and then raised again after the stem head has been loaded. The new arrangement permits even greater operating speeds, easier maintenance of the stem heads, and elimination of all gas and air manifolds along with their associated mixtures and valves and the burner swinging mechanisms. The heating has proved to be quite uniform with no blackening of the glass and with proper color of the conventional Dumet seal portions of the lead-in wires.

Still further features and advantages of the invention will appear from the following detailed description and from the drawing wherein:

FIG. 1 is a top plan view of a machine comprising the invention;

FIG. 2 is a radial section through the turret showing one of the stem heads and a stem pinch or press unit in operative relation thereto;

FIG. 3 is a fragmentary top plan view of the stem head and pinch unit shown in FIG. 2;

FIG. 4 is a fragmentary front elevation of a stem head holding the several stem parts, and also showing the associated burners located at several different elevations occupied thereby when the head is located at different stations;

FIG. 5 is a chart showing the elevaiton of the burners at different stations around the turret;

FIG. 6 is a chart showing the temperature of the glass in the area of the pinch or press as it is carried to successive stations around the turret, the temperature having been measured with an optical pyrometer;

FIGS. 7 and 8 are, respectively, an elevation and a sectional view along line 8—8 (FIG. 7) of a stem and associated pinch jaws or matrices with the stem head located at a preliminary or first pinch station 12 (FIG. 1);

FIG. 9 is a fragmentary front elevation of a stem head showing the burner position at a second pinch station 15;

FIGS. 10 and 11 are, respectively, a side elevation and a sectional view along line 11—11 (FIG. 10) of the stem and pinch jaws located at said station 15;

FIGS. 12 and 13 are views similar to FIGS. 10 and 11 showing the stem and different pinch jaws located at a third pinch station 18;

FIG. 14 is a fregmentary front elevation of a stem head and associated burners and air jets when the stem head is located at a blow-out and reworking station 19;

FIG. 15 is an elevation, in section, of the stem showing the exhaust aperture blown through a side wall thereof; and FIG. 16 is an elevation, in section, showing the appearance of the stem as reworked, as well as a pair of jaws used in a fourth pinch operation.

Referring to FIG. 1 of the drawing, the cycle of stem making starts when a head 29 (FIG. 2) of the stem making machine is located at station 1, the first of twenty-eight stations located about an intermittently indexed turret 30 (FIG. 2). Except for the number thereof, each of these heads corresponds to those shown in the aforesaid Patent 1,655,141 to J. T. Fagan et al., and comprises a series of three vertically spaced and aligned pairs of jaws 31, 32 and 33 (FIGS. 2, 3 and 4) for holding the glass parts of a stem, and jaws 34 plus tubular holders or so-called weld cups 35 (FIG. 2) for holding the metal lead wires 51 of the stem in conventional manner. In each instance, both jaws are connected by respective links 36' (FIG. 3) to oppositely extending arms of collars 36 (FIGS. 2 and 3) which are spaced along a vertical operating shaft 37 which is supported by the three brackets 38, 39 and 40 comprising the main body portion of the head.

At the start of the cycle, the several said pairs of jaws 31 to 34 are held in an open position against the biasing pressure of helical springs 41 each extending between one of the arms of the respective collars 36 and spring posts in the corresponding brackets 38, 39 and 40 located on an adjacent head. Two upstanding posts 42 and 43 join the three said brackets into a single unit, the lowermost bracket 40 being mounted upon a peripheral portion of the turret 30.

The operating cycle is initiated when a flared glass stem tube 44, which may be made of a soft lead glass conventional in the art, slides down slide rails 45 (FIG. 1) to a position between the jaws 32 under the control of conventional feeding means (not shown) and is followed by a counter clockwise indexing movement of the head and an immediate closing movement of the jaws 32 so that the stem tube 44 is supported therebetween. The closing movement of the jaws 32 results from movement of a roller 46 (FIG. 2) on arm 47 on the lower end of the operating shaft 37 away from a high or rise portion on the stationary cam 48, so that the shaft 47 is rotated sufficiently to back off an ear on the collar 49 away from a pin 50 projecting from the operating collar 36 associated with these jaws 32. This rotation of the operating shaft 37 also effects a partial closing motion in each of the other jaws of the head, but this motion is not effective to fully close these other jaws, although it allows the spring 41 associated with the jaws 32 free action to cause the jaws 32 to grip the stem tube 44.

While the head is located at stations 2 and 3, a pair of lead wires 51 are threaded end foremost through the stem tube 44 and into the tubular holders or weld cups 35 by other conventional automatic feeding machines which are not shown.

At station 5, the last of the parts comprising the stem, the glass exhaust tube 52, is automatically threaded downward through the center of the flared stem tube 44, and the jaws 31 and 33 are closed to hold it in place. This feeding operation, like all other feeding funcitons and mechanisms so far described, are virtually the same as those described in greater detail in the aforesaid Fagan et al patent. Those functions and mechanisms likewise cause the jaws 31 and 33 to close as the roller 46 on arm 47 on shaft 37 has, during the previous index, passed from cam 48 to the roller 53 of an operating arm 54 (shown in FIG. 2 but actually located at station 5), and the operating arm 54 has now moved sufficiently to permit the full travel of arm 47. This movement of the arm 47 and the connected operating shaft 37 is converted directly into movement of the jaws 31, since the collar 36 associated therewith is fastened to said operating shaft 37, and, in the case of jaws 33, causes the ear of the collar 55 to be backed off away from a depending pin 56 on the associated collar 36 so that the jaws 33 are free to close. Likewise, the operating shaft 37 causes the ear of the collar 57 to be backed off away from the depending pin 58 on the collar 36 associated with jaws 34 so that portions of the lead wires adjacent the lower end of the stem tube 44 are positioned and gripped thereby.

In accordance with the present invention, a pair of burners 61 and 62 (FIG. 3) are mounted upon rigid supporting conduits or manifolds 63 and 64 which extend generally radially of the turret and along either side of each head to blocks 65 and 66 on pivot pin 67 projecting from bracket 40, and to a common junction block 68 beyond the end of the bracket 40. These opposed burners 61 and 62, which are at opposite sides of the stem parts and are, at the presently described stations 5, located below at least the glass parts as shown in dot-dash lines designated A in FIG. 4 and at the lowermost elevation A indicated in the burner location chart shown in FIG. 5. This lowermost position of the burners is due to the fact that the junction block 68 is at a raised position as determined by a high portion of a fixed circular cam 69 which is concentric with the turret axis and is engaged by a roller 70 on the junction block 68 so that the supporting conduits 63 and 64 are tilted counter clockwise (FIG. 2) about the pivot pin 67 against the action of the springs 67'. The lowered position of the burners 61 and 62 is such that they are clear of all portions of the stem parts feeders and the field of movement of the jaws of the head.

The first operation affecting the burners 61 and 62 occurs when a head arrives at station 6 and a passage 71 (FIG. 2) in the rotating upper portion of a rotary valve 72 located at the axis of the turret registers with an arcuate supply passage 73 (FIG. 1) in the stationary valve part carrying a combustible gas, and gas flows through the flexible hose 74 (FIG. 2) to the junction block 68 and the conduits 63 and 64 to the burners. A relatively small amount of gas flows at such times as the supply passage 73 (FIG. 1), which is fed from the centrally located main supply passage 75, contains a restriction (such as indicated in dot-dash lines for illustrative purposes only at 75′ in supply passage 76 in FIG. 2). However, sufficient gas flows to purge the air from the connecting passages by the time the head is again indexed, this time to station 7, so that a soft flame will then issue from each burner. Also in the course of moving to station 7, the burners 61 and 62 are raised to the position indicated at B in FIG. 4 and in FIG. 5, by passage of the junction block roller 70 onto a low portion of the cam 69, and the gas emitted therefrom is lighted by pilot burners 77 (FIG. 1). The function of the burner flames at this time is to wash or preheat an upper part of the stem tube 44 with light warming gas, this condition being maintained through the interval during which the burners also occupy station 8. In the course of movement to the latter station, the burners move down along the stem tube 44 to the position shown in full lines and indicated at C in FIG. 4 and also in FIG. 5, so that the fires wash the lower end of the stem tube 44.

The advance of a head to the next station 9 causes the associated burners 61 and 62 to receive the full operating pressure of gas (preferably an oxygen enriched gas and air mixture) from the supply passage 76 in the rotary valve 72 so that relatively sharp and hard oxidizing flames are emitted therefrom. This flame character and burner position are maintained driving the several succeeding indexing and rest periods and have the effect of heating the stem tube 44 above the softening point as illustrated in FIG. 6. The hard flames have the effect of softening and bending the open lower end of the stem tube upon and around the enclosed seal portions of the lead wires 51 at a quite rapid rate so as to protect those lead wire portions from undue direct contact with the flames.

However, it is preferred that at station 12 small localized lower end portions of the stem tube 44 are flattened about the portions of the lead wires extending therethrough by the pinching action of the matrices 78 and 79 (FIGS. 1, 7 and 8) of a pinching or pressing unit 80 (FIG. 1). This function is timed to occur as soon as the glass of the stem tube can be worked since its purpose is to assure sealing off the seal portion of the leads 51 so that the conventional borate glaze coating thereon is not burned off and the underlying surface oxidized. As shown in FIGS. 7 and 8, the matrices 78 and 79 have opposed projecting protuberances or pads 78 and 79 which engage only small areas of the stem tube around each lead wire, and which are cut away or recessed in the area of the exhaust tube 52 in order to avoid pressure against that area which is not yet sufficiently heated to properly be worked. As indicated in FIG. 6, the matrices 78 and 79 lower the temperature of the flattened portion of the stem tube 44 appreciably.

Stem pressing or pinching units are generally well known and are therefore not described herein in complete detail. The matrices 78 and 79, in the present case, are attached to and form part of jaws 81 and 82 (FIGS. 2 and 3) which are pivoted on respective pins 85 in a depending portion of a positioning slide 86 and normally are spaced apart by a wedge 87 located between rollers 88 on respective intermediate jaw portions.

The jaws 81 and 82 are first advanced toward the stem tube 44 by movement of the positioning slide 86 in ways on a supporting bracket 89, and close on the stem tube 44 when the independent continuing motion of the wedge-carrying subslide 90 in ways on the top of the positioning slide 86 moves the wide portion of the wedge 87 away from between the rollers 88. Both operations of the jaw are effected by a single pivotal motion of a vertically extending arm 91 in engagement with a roller 92 on the subslide 90, as the slide 86 and subslide 90 are caused to move together, until the jaws are properly positioned relative to the stem, due to the action of a spring 93 which extends between a spring post in support bracket 89 and a heel plate 94 on the slide 86 and which normally urges the slide 86 forwardly to hold the stop screw 95 against the end of the subslide 90. When the jaws are properly positioned with respect to the stem tube 44, the stop screw 96 seats against the end of the bracket 89 and the motion of the arm 91 continues to advance the subslide 90 so that a narrower part of the wedge 87 is moved between the rollers 88, and the jaws 81 and 82 are closed by the contraction of a spring 97 which extends between spring posts in respective jaws. The operating arm 91, which is attached to a short shaft 98, is actuated by rotation of the shaft 98 by a second arm 99 which, in conventional manner, is controlled by the vertical movement of an operating rod 100 which extends to cam timed and controlled means associated with the main drive means of the machine. The return movement of the operating arm 91 separates and retracts the matrices 78 and 79 from the stem which now has the appearance shown in FIGS. 7 and 8.

In the following interval during which the partly completed stem is located at station 13, the associated burners 61 and 62 replace the heat lost to the matrices 78 and 79, as illustrated in FIG. 6, and continue to raise the temperature of the press area of the stem. Upon moving to station 14, the burners 61 and 62 move upward very slightly, as indicated at D in FIG. 5, and in moving to station 15 further upward motion occurs in the burners 61 and 62 as indicated at E. The effect of the upward movement is to spread the heat upward along the press area of the stem tube 44 and to further heat that area so that the matrices 83 and 84 (FIGS. 1, 9, 10 and 11) of the pinching and pressing unit at station 15 are able to flatten even greater areas around the lead wires as shown in FIGS. 10 and 11. At this time the stem tube 44 is partially sealed to the exhaust tube 52 and the passageway therethrough is partially closed as shown in FIG. 11. As shown in FIG. 6, the matrices 83 and 84 cool the stem press area somewhat but the heat generated by the burners 61 and 62 again brings the stem to a working temperature at the next succeeding station 16.

Preparatory to an even more complete third pinch or press operation, the heat is again spread over the press area of the stem tube. To that end, in traveling between stations 16 and 17 the burners 61 and 62 are lowered (F in FIG. 5) to more effectively heat the lower end of the stem tube 44, and upon entering station 18 the burners 61 and 62 again return to the raised position G. At the latter station 18, the matrices 101 and 102 (FIGS. 1, 12 and 13) of the pinch or press unit 103 at that station are brought against the heated central portion of the stem press area as shown in FIGS. 12 and 13. The highly heated condition of the press area at this time permits the matrices to complete the closing off of the exhaust tube, the sealing of the stem tube and exhaust tube and a bunching or gathering of glass around the leads 51. The matrices 101 and 102 are also characterized by a cavity or groove 104 in one matrix (101). The cavity 104 has the function of avoiding contact of the matrix 101 with that portion of the assembly adjacent the juncture of the exhaust tube and stem tube so that it is not cooled as is the remainder of the press area, thereby facilitating the subsequent blowing of an aperture through the stem wall at that point.

At station 19, there are performed the operations of blowing the exhaust aperture or hole 105 (FIG. 14) through the wall of the stem tube 44 in communication with the exhaust tube 52, and the strengthening and reforming of the seal area adjacent the stem press or pinch. The aperture 105 is created by air blown into the upper end of the exhaust tube 52 by a nozzle 107 (FIG. 14) permanently located over station 19. The aperture 105 is formed immediately adjacent the press area 105′ (FIG. 15) at a point which is at a somewhat higher temperature due to the presence of the cavity 104 in the matrix 101 (FIG. 12). The strengthening and reforming or reworking of the seal area is the result of air pressure from a second jet 108 located over the upper flared end of the stem tube 44 and which keeps the exhaust tube 52 from expanding to any extent sufficient to thin out the walls thereof, and also expands and rounds out the juncture of the stem tube 44 and exhaust tube 52 to eliminate sharp corners which would otherwise cause strains in the glass.

Movement of the head to station 20 causes the burners 61 and 62 to rise to their highest point, shown at H in FIG. 5, where they are in position to melt down and glaze the upper lip around the aperture 105 and generally condition the seal area of the stem tube. Upon indexing to station 21, the burners 61 and 62 are moved to a lower position, shown at J in FIG. 5, where they heal or glaze the lower lip of the aperture 105 and further condition the stem tube (FIG. 16).

There is also located at station 21 a fourth pinching or pressing unit 109 (FIG. 1) having matrices 110 and 111 (FIG. 16) which refine the shape of the press or pinch area 105′ and imprint code control marks thereon.

The movement of the head to the station 22 causes the combustible gas mixture to the burners 61 and 62 to be cut off, and the burners 61 and 62 to be lowered to level K in FIG. 5 where they are clear of the jaws on the head and are too low to interfere with the loading of stem parts for the next cycle of operation. The gas mixture is cut off when the rotary valve passage 71 (FIG. 2) associated with the head at station 22 is carried beyond the end of the supply passage 76 (FIGS. 1 and 2).

While a particular machine has been described in detail, it will be evident to those skilled in the art that many variations may be made in the timing and extent of movement of the burners, for example when the machine is operated at different speeds and is used to make different sizes of stems or stems having more than two lead-in wires. These variations may also include a change in the number of pinch or press units, either more or less than the number specifically described herein.

What I claim as new and desire to secure by Letters Patent of the United States is:

1. In a machine for manufacturing stems for electric lamps and similar devices comprising a rotatable intermittently indexing turret having at its periphery a plurality of heads arranged to fixedly support stem parts including a vertically disposed glass stem tube with a glass exhaust tube extending concentrically into the interior of said stem tube and a plurality of lead wires extending through the annular space between said stem and exhaust tubes, a pair of burners mounted on said turret adjacent each head to be at opposite sides of the said stem parts supported thereby, means to supply a flow of combustible heating gas composition to said burners continuously over a period during which indexing of the turret carries the heads to a series of working stations around said turret, means mounting each pair of said burners for vertical movement along the stem tube in the assoicated head, means for effecting movement of the burners to be at predetermined different levels at predetermined ones of said stations for optimum heating of selected predetermined portions of the glass stem and exhaust tubes to a plastic condition preparatory to hereinafter recited operations of pinching, blow-out and reworking, the aforesaid means to supply a flow of combustible heating gas including valve means on said turret connecting said burners with a source of heating gas and arranged to supply gas in equal predetermined amounts and composition to all burners when located at and while indexing to a preselected series of working stations, pinch units mounted adjacent the path of movement of said heads at predetermined spaced working stations and including pinch jaw means, means mounting said pinch jaw means for movement into operative relation to heads at said stations and for clamping movement to conjointly pinch the stem tube and exhaust tube to a compressed press seal portion which joins together and hermetically closes the passages through said stem and exhaust tubes and also embeds portions of the lead wires therein, means at another working station to blow compressed air into the upper end of the exhaust tube in a head located thereat to blow out an aperture through the wall of the associated stem tube immediately adjacent the press seal portion, and additional means to blow compressed air into the upper end of the annular space between the stem and exhaust tubes to rework the plastic glass portions thereof immediately adjacent said press seal portion and the aperture; wherein the means mounting each pair of said burners for vertical movement comprises burner support members carrying the respective pairs of burners at outer ends thereof and extending generally radially inward of the turret and having a cam-engaging member at their inner ends, means mounting said burner support members for pivotal movement about a horizontal axis intermediate their ends, and the means for effecting movement of the burners comprises a circular cam concentric with the turret axis and having a cam surface engaged by said cam-engaging member and contoured to effect pivotal movement of the burner support members upon rotation of the turret.

2. A machine as set forth in claim 1 wherein said burner support members comprise rigid conduits which are in communication with the interior of respective burners for carrying the gas mixture thereto, said conduits being connected at their inner ends through flexible conduit means to said valve means which is a rotary valve located on the turret axis.

3. In a machine for manufacturing stems for electric lamps and similar devices comprising a rotatable intermittently indexing turret having at its periphery a plurality of heads arranged to fixedly support stem parts including a vertically disposed glass stem tube with a glass exhaust tube extending concentrically into the interior of said stem tube and a plurality of lead wires extending through the annular space between said stem and exhaust tubes, a pair of burners mounted on said turret adjacent each head to be at opposite sides of the said stem parts supported thereby, burner support members comprising rigid conduits which carry the respective pairs of burners at outer ends thereof and which are in communication with the interiors of respective burners for carrying a gas mixture thereto, said conduits extending generally radially inward of the turret, a common chamber member joining together the inner ends of said conduits and carrying a cam-engaging member, means mounting said conduit members for pivotal movement about a horizontal axis intermediate their ends, and means for effecting movement of the burners upon rotation of the turret comprising a circular cam concentric with the turret axis and having a cam surface engaged by said cam-engaging member and contoured to effect a pivotal movement of the conduit support members upon rotation of the turret to cause said burners to be at predetermined different levels at predetermined ones of a series of working stations around said turret for optimum heating of selected predetermined portions of the glass stem and exhaust tubes to a plastic condition preparatory to hereinafter recited operations of pinching, blow out and reworking, means to supply a flow of combustible heating gas composition to said burners continuously over a period during which indexing of the turret carries the heads to said working stations, the last-named means including rotary valve means located on the turret axis and connecting said burners with a source of heating gas and arranged to supply gas in equal predetermined amounts and composition to all burners when located at a preselected series of working stations, said valve means being connected by flexible conduits to the respective common chambers at the inner ends of the respective conduit support members, pinch units mounted adjacent the path of movement of said heads at predetermined spaced working stations and including pinch jaw means, means mounting said pinch jaw means for movement into operative relation to heads at said stations and for clamping movement to conjointly pinch the stem tube and exhaust tube to a compressed press seal portion which joins together and hermetically closes the passages through said stem and exhaust tubes and also embeds portions of the lead wires therein, means at another working station to blow compressed air into the upper end of the exhaust tube in a head located thereat to blow out an aperture through the wall of the associated stem tube immediately adjacent the press seal portion, and additional means to blow compressed air into the upper end of the annular space between the stem and exhaust tubes to rework the plastic glass portions thereof immediately adjacent said press seal portion and the aperture, the means for effecting movement of the burners and the means to supply a flow of combustible heating gas including means to initially raise the burners to a maximum elevation and to supply soft fires to preheat a relatively large area along the lower end of the stem tube, to thereafter continuously supply gas flow forming concentrated hard flames and to lower the burners to direct the flames at the lowermost end of the stem tube during several indexing intervals of the turret to collapse the said lower end of the stem tube upon the lead wires and exhaust tube, followed by movement of the burners vertically along the stem tube to highly heat a preselected area preparatory to arrival of a head carrying the stem at a predetermined station occupied by a pinch unit, and maintenance of the burners at an elevated position preparatory to arrival of the heads at a station occupied by the said means to blow out the aperture and to rework the plastic glass portions immediately adjacent the press seal portion and the aperture.

References Cited

UNITED STATES PATENTS

| | | | |
|---|---|---|---|
| 1,655,140 | 1/1928 | Fagan | 65—138 |
| 2,282,993 | 5/1942 | Dichter | 65—271 |

S. LEON BASHORE, Primary Examiner

SAUL R. FRIEDMAN, Assistant Examiner

U.S. Cl. X.R.

65—155, 269, 271